March 13, 1934.     J. E. PICCARD     1,950,995

OLEOPNEUMATIC STRUT

Filed June 8, 1932

INVENTOR
JULES E. PICCARD

BY HIS ATTORNEY

Patented Mar. 13, 1934

1,950,995

UNITED STATES PATENT OFFICE 1,950,995

OLEOPNEUMATIC STRUT

Jules E. Piccard, Westbury, N. Y., assignor to Curtiss Aeroplane & Motor Company, Inc., a corporation of New York Application June 8, 1932, Serial No. 615,984

2 Claims. (Cl. 267—64)

My invention relates to improvements in aircraft landing gears and more particularly to shock absorbing mechanism employed in such landing gears.

An object of my invention is to provide an improved form of hydraulic-pneumatic shock absorbing strut to absorb landing shocks and also to furnish an effective means for resiliently supporting the aircraft while it is taxiing along the ground.

An additional object of my invention is to provide a shock absorbing strut wherein there is a minimum possibility of leakage of the liquids contained therein.

A further object of my invention is to provide a shock absorbing strut of light weight, having a minimum number of moving parts, thus avoiding the necessity of repairs and adjustments in service.

The use of hydro-pneumatic shock absorbing mechanisms is advantageous in aircraft as they have the merit of being lighter in weight than the conventional oleo struts employing rubber or steel springs as resilient means for taxiing. Compressed air forms an ideal resilient supporting means, and in combination with the hydraulic mechanism for slowly absorbing impact shocks the resultant strut is very effective. However, hydro-pneumatic struts of conventional form have certain disadvantages. It is necessary to carry high pressures of air within the body of the strut in order to have an adequate load carrying capacity. It is difficult with such high pressures to effectively seal the strut against leakage. It is, of course, a well known fact that it is more difficult to provide a tight seal against air than against liquid. The structure of my strut largely eliminates this difficulty through the fact that the air is entrapped in a continuous cylinder having no outlets, openings, valves or plugs of any kind. Likewise, my invention includes a check valve for filling the strut and for relieving the pressures therein, such valve being located at all times below the normal level of the oil or fluid contained in the strut. This valve, being below the normal level of the liquid can be made pressure tight with little difficulty. Likewise, my strut includes a packing gland so arranged that the pressure of the fibrous packing is increased against the plunger when the shock absorber strut is inactive and fully extended.

By the arrangement of the metering orifice allowing the slow passage of liquid therethrough, structural difficulties are simplified, since this orifice is made a fixed part of the shock absorber cylinder. This orifice is contained in a partition wedged into the shock absorber cylinder and thus obviates the necessity of rivets, bolts, etc., to hold it in place against the large pressures generated in the cylinder. In order to explain my invention more clearly, one embodiment thereof is shown in the following drawing, in which.

Figure 1:
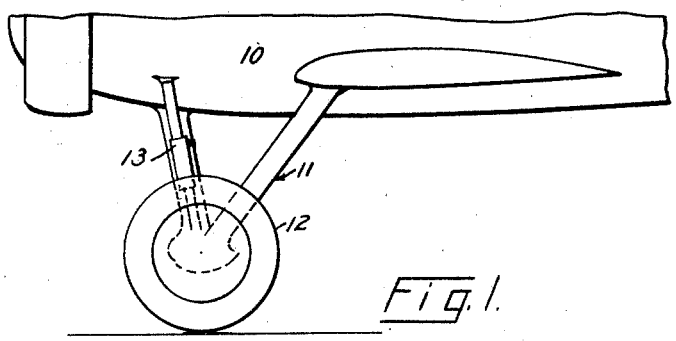
Fig. 1 is a side elevation of my invention as applied to a landing gear.
Figure 2:
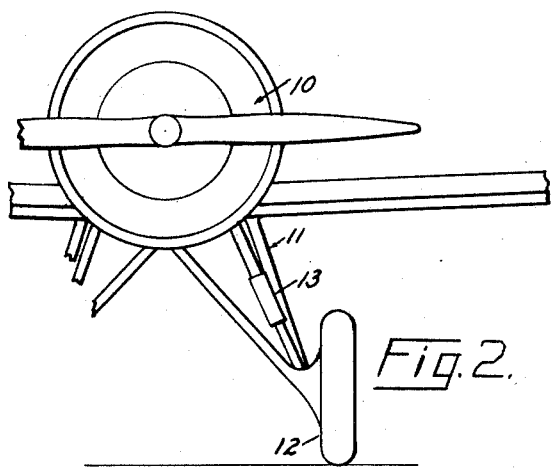
Fig. 2 is a front elevation of my invention as applied to a landing gear.
Figure 4:
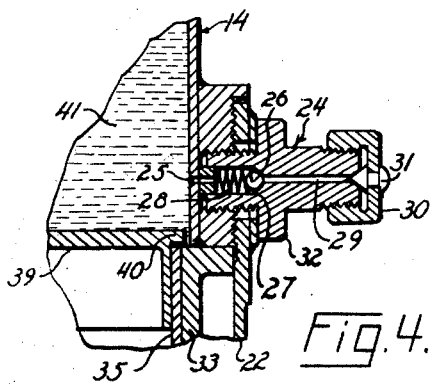
Fig. 4 is an enlarged cross section of a portion of Fig. 3.
Figure 3:
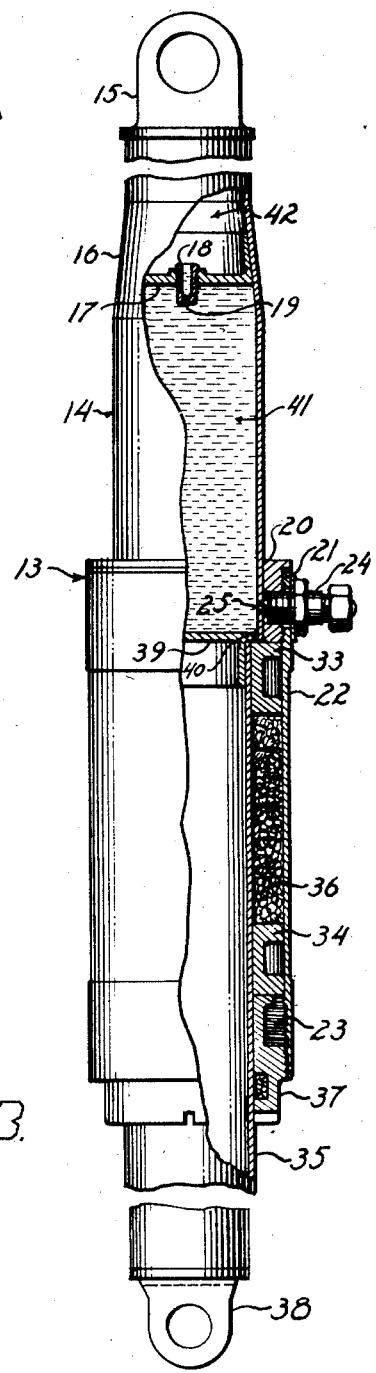
Fig. 3 is a partially sectioned elevation of my invention.

In the illustrations, in which similar parts bear similar numbers, 10 is an airplane having a landing gear 11 to which are attached wheels 12. Included in the landing gear 11 is a shock absorber strut 13. My invention has reference particularly to the structure and arrangement of parts of the shock absorber strut 13 shown in detail in Fig. 3. The strut 13 comprises a cylinder 14 closed at its upper end and provided with an eye 15, whereby it may be attached in the landing gear assembly 11. The cylinder 14 includes intermediate its length a tapered portion 16. Within the tapered portion 16 is inserted a partition 17 having its outer periphery 18 tapered in complement to the taper 16 of the cylinder 14. This partition 17 is forced into the taper 16 and is brazed thereto when the apparatus is assembled. In the center of the partition 17 is fastened a plug 18, which plug is provided with an orifice 19 of suitable size for the weight of the airplane.

At the lower end of the cylinder 14 is fixed a boss 20 having screw threads 21 on its outer circumference. A sleeve 22 having threads formed on the inside of one end, is screwed on the boss 20. The sleeve 22 likewise has internal threads 23 at its lower end, the purpose of which will be described later. A check valve 24 is screwed through the sleeve 22 and into the boss 20, which check valve is allowed to communicate with the inside of the cylinder 14 through the hole 25 in the cylinder wall.

The check valve 24 comprises a body 32, a valve seat 26 on which a ball 27 sets. The ball 27 is normally retained against the seat 26 by means of a spring 28. The check valve body 32 is likewise provided with a passage 29 allowing communication between the passage 25 and the outside air through the check valve 26 and the passage 29. The valve body 32 is provided with a cap 30 which is screwed on the valve body. The cap 30 has formed thereon a conical point 31 which engages the passage 29 when the cap 30 is screwed down, thus forming an additional seal against the escape of liquid from the interior of the cylinder 14.

The sleeve 22 is provided with two annular bushings 33 and 34 spaced from each other. Between the two bushings in the annular space between the sleeve 22 and the plunger 35 there is fitted a fibrous packing 36. The packing 36 is compressed between the bushings 33 and 34 by means of a packing nut 37, which engages the threads 23 at the lower end of the sleeve 22. By screwing in the packing nut 37, the bushing 34 is moved inwardly, thus compressing the packing and causing the packing to bear heavily against the plunger 35.

The plunger 35 is provided at its lower end with an eye 38 which permits the assembly of the strut 13 in the landing gear 11. At the upper end of the plunger 35 is located a plunger head 39 which closes the end of the plunger. A flange 40 on the plunger head 39 overlaps the edge of the plunger 35, and the flange 40 in the position shown in Fig. 3, bears against the bushing 33. A compartment 41 defined by the cylinder 14, the partition 17 and the plunger head 39, will normally be filled with a liquid. The compartment 42 defined by the cylinder 14, the partition 17 and the eye 15 will normally be filled with air.

In order to prepare the strut for operation, the plunger 35 is extended with respect to the cylinder 14. Both compartments 41 and 42 will be full of air under normal atmospheric pressure. The cap 30 is removed from the check valve 24 and liquid is forced through the check valve under pressure. Liquid is forced in until it fills the compartment 41. As the liquid is forced into the compartment 41 it compresses the air therein, forcing it through the orifice 19 until it is entrapped under pressure in the compartment 42. The cap 30 is then replaced on the check valve 24.

When installed on an airplane, the weight of the airplane 10 upon the wheels 12 will cause a deflection of the strut 13 causing the plunger 35 to telescope within the cylinder 14, thus forcing some of the liquid from the compartment 41, through the orifice 19 into the compartment 42 until the air pressure built up in the compartment 42 balances the weight of the airplane 10. Upon the airplane 10 leaving the ground, the pressure of air in the compartment 42 forces the liquid entrained in said compartment through the orifice 19 into the compartment 41, causing an extension of the plunger 35 with respect to the cylinder 14. The extension of the plunger 35 is limited by the engagement of the flange 40 with the bushing 33. As there is initial compression of air in the compartment 42, this pressure will cause the flange 40 to bear heavily against the bushing 33, thus causing compression of the packing 36 and serving to prevent leakage.

Upon landing of the airplane 10, the wheels 12 by their impact with the ground, cause an upward movement of the plunger 35 within the cylinder 14. The pressure generated in the liquid in the compartment 41 causes it to seek egress through the orifice 19 into the compartment 42. As the liquid passes through the orifice 19, the air in the compartment 42 is compressed. The combined compression of the air in the compartment 42 and the retarding action of the passing of the liquid through the orifice, combines to absorb the shock of landing. As the airplane comes to rest, the pressure of air in the compartment 42 again will balance the weight of the airplane 10.

As the ship is taxied over the ground, any inequalities in the terrain will cause an alternate reciprocating action of the plunger 35 within the cylinder 14. The shocks so caused will be dampened by the alternate passage of liquid through the orifice 19, from the compartment 41 to the compartment 42, and vice versa.

It will be seen from the above description that the check valve 24 is at all times below the liquid level in the strut 13, and loss of pressure is minimized by the location of said check valve, as it is at all times subject to liquid presssure rather than to air pressure. Likewise, it will be apparent that when landing shocks generate a high pressure in the compartment 41, this pressure serves to impel the partition 17 upwardly within the cylinder 14, and that by the wedging action of the partition 17 within the tapered portion 16, it is firmly retained in its proper position without the necessity of bolts, rivets, etc., which would furnish a medium for failure and leakage.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a hydro-pneumatic shock absorbing strut, a tubular cylinder closed at its upper end, a tubular piston having a flanged head, said piston and said head being adapted to telescope within said cylinder at its open end, an annular boss encircling and attached to the lower open end of said cylinder, a sleeve of larger diameter than either said cylinder or said piston encircling and attached to said boss and encircling a portion of said piston, bearing annuli within said sleeve and bearing on said piston, packing means separating said annuli, and a packing nut engaging within the open end of said sleeve for holding said annuli and said packing therewithin.

2. In a hydro-pneumatic shock absorbing strut, a tubular cylinder closed at its upper end, a tubular piston having a flanged head, said piston and said head being adapted to telescope within said cylinder at its open end, an annular boss encircling and attached to the lower open end of said cylinder, a sleeve of larger diameter than either said cylinder or said piston encircling and attached to said boss and encircling a portion of said piston, bearing annuli within said sleeve and bearing on said piston, packing means separating said annuli, a packing nut engaging within the open end of said sleeve for holding said annuli and said packing therewithin, and a check valve opening into said cylinder and carried by said boss and said sleeve.

JULES E. PICCARD.